United States Patent
Hayes et al.

(10) Patent No.: US 9,769,752 B2
(45) Date of Patent: Sep. 19, 2017

(54) MULTI-MODAL WIRELESS CONNECTION MANAGEMENT

(71) Applicant: QUALCOMM Incorporated, San Diego, CA (US)

(72) Inventors: Kevin Neal Hayes, Mountain View, CA (US); Adam Benjamin Lapede, Los Altos, CA (US); Prerepa Viswanadham, Fremont, CA (US); Dragan Petrovic, Union City, CA (US); Mahesh Dandapani Iyer, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 14/618,386

(22) Filed: Feb. 10, 2015

(65) Prior Publication Data
US 2016/0066270 A1    Mar. 3, 2016

Related U.S. Application Data

(60) Provisional application No. 62/045,428, filed on Sep. 3, 2014.

(51) Int. Cl.
*H04W 52/02*  (2009.01)
*H04L 29/08*  (2006.01)
(Continued)

(52) U.S. Cl.
CPC ..... *H04W 52/0216* (2013.01); *H04L 67/1046* (2013.01); *H04W 48/16* (2013.01);
(Continued)

(58) Field of Classification Search
CPC ......... H04W 52/0216; H04W 52/0219; H04W 48/16; H04W 84/12; H04W 84/18;
(Continued)

(56) References Cited

U.S. PATENT DOCUMENTS 8,335,937 B2   12/2012   Qi et al.
8,391,260 B1   3/2013    Kopikare et al.
(Continued)

OTHER PUBLICATIONS

Camps-Mur D., et al., "Device to Device Communications with WiFi Direct: Overview and Experimentation," IEEE Wireless Communications, Jun. 2013, vol. 20 (3), pp. 1-8.
(Continued)

*Primary Examiner* — Bob Phunkulh
(74) *Attorney, Agent, or Firm* — Paradice and Li LLP

(57) ABSTRACT

A wireless device configured as a group owner determines whether all client devices paired with the group owner are currently associated with the group owner. If all paired client devices are currently associated with the group owner, the group owner enters a first mode in which the group owner is in an active mode (powered up to communicate) during a first portion of a beacon interval and is in a low power mode (in which no communication occurs) during a second portion of the beacon interval. If not all paired client devices are currently associated with the group owner, the group owner enters a second mode in which the group owner is in the active state during the first portion and at least part of the second portion of the beacon interval. The group owner and client devices are configured to operate as master and slave.

27 Claims, 6 Drawing Sheets

(51) Int. Cl.
*H04W 48/16* (2009.01)
*H04W 84/12* (2009.01)
*H04W 84/18* (2009.01)

(52) U.S. Cl.
CPC ........ *H04W 52/0219* (2013.01); *H04W 84/12* (2013.01); *H04W 84/18* (2013.01); *Y02B 60/50* (2013.01)

(58) Field of Classification Search
CPC .. H04W 88/06; H04W 76/02; H04L 67/1046; H04M 1/7253; H04M 2250/02
See application file for complete search history.

(56) References Cited

U.S. PATENT DOCUMENTS

| | | | |
|---|---|---|---|
| 8,458,504 B2 | 6/2013 | Kangude et al. | |
| 8,611,268 B1 | 12/2013 | Thandaveswaran | |
| 8,717,923 B2 | 5/2014 | Vedantham et al. | |
| 2011/0161697 A1* | 6/2011 | Qi | G06F 1/3209 713/320 |
| 2011/0185200 A1 | 7/2011 | Sim et al. | |
| 2011/0188391 A1 | 8/2011 | Sella et al. | |
| 2012/0106381 A1* | 5/2012 | Vedantham | H04L 1/1854 370/252 |
| 2012/0195227 A1* | 8/2012 | Vedantham | H04W 52/0232 370/253 |
| 2013/0028156 A1* | 1/2013 | Vedantham | H04W 52/0229 370/311 |
| 2013/0124894 A1* | 5/2013 | Cho | H04W 52/0229 713/323 |
| 2013/0238919 A1* | 9/2013 | Ponmudi | H04W 52/0216 713/323 |
| 2014/0032951 A1 | 1/2014 | Garg et al. | |
| 2014/0071870 A1 | 3/2014 | Abraham et al. | |
| 2014/0334368 A1* | 11/2014 | Zhou | H04W 48/12 370/311 |

OTHER PUBLICATIONS

"Realek Wi-Fi Direct Programming Guide", Dishing Tech blog, http://dishingtech.blogspot.com/2012/01/realtek-wi-fi-direct-programming-guide.html, article published Jan. 15, 2012, printed from the world wide web on Aug. 1, 2014, 14 pages.
"Wi-Fi DirectTM Chat—Managing Connection", https://developer.tizen.org/dev-guide/2.2.0/org.tizen.native.appprogramming/html/tutorials/net_ . . . , printed from the world wide web on Aug. 1, 2014, 7 pages.
"WL12xx Wifi Direct P2P GO opportunistic power save protocol", http://e2e.ti.com/support/wireless_connectivity/f/307/t/302670.aspx, printed from the world wide web on Aug. 5, 2014, 9 pages.
International Search Report and Written Opinion—PCT/US2015/044100—ISA/EPO—Oct. 15, 2015.

* cited by examiner

MULTI-MODAL WIRELESS CONNECTION MANAGEMENT

CROSS-REFERENCE TO RELATED APPLICATION

This application claims priority to U.S. Provisional Patent Application No. 62/045,428 entitled "MULTI-MODAL WIRELESS CONNECTION MANAGEMENT" filed Sep. 3, 2014, the entirety of which is incorporated by reference herein.

TECHNICAL FIELD

The present embodiments relate generally to wireless communications, and specifically to discoverability and power management of wireless devices.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. The beacon frames, which may include traffic indication maps (TIM) and timing synchronization function (TSF) values, are typically broadcast according to a target beacon transmission time (TBTT) schedule. Thus, the beacon frame broadcasts may be separated by a time interval known as the "beacon interval." In a typical WLAN, only one STA may use the wireless medium at any given time, and each STA may be associated with only one AP at a time.

A STA may locate nearby APs and select a suitable AP with which to associate by performing scanning operations. For example, in passive scanning, the STA listens on one or more wireless channels for beacon frames periodically broadcast by nearby APs. Each beacon frame includes the AP's SSID, supported data rates, synchronization information, and other information related to authenticating and associating with the AP. In active scanning, the STA tries to locate nearby APs, and initiates the scanning process by broadcasting probe request frames. APs within wireless range of the STA response with probe responses that may include information related to authenticating and associating with the AP. Thus, active scanning allows the STA to receive immediate responses from APs (e.g., without waiting for transmission of beacon frames).

Scanning operations may consume significant power. Because many STAs are battery powered, there is a need to reduce the power consumption related to scanning operations. More specifically, there is a need to reduce power consumption of devices that are to be discoverable by other devices during scanning operations.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of operating a wireless device configured as a group owner includes determining whether all client devices paired with the group owner are currently associated with the group owner. If all paired client devices are currently associated with the group owner, the group owner enters a first mode in which the group owner is in an active state (e.g., powered up to communicate with other devices) during a first portion of a beacon interval and is in a low power mode (e.g., in which no communication occurs with other devices) during a second portion of the beacon interval. Power consumption may be reduced during the first mode. If not all paired client devices are currently associated with the group owner, the group owner enters a second mode in which the group owner is in the active state during the first portion of the beacon interval and at least part of the second portion of the beacon interval. Discoverability of the group owner is increased during the second mode, although power consumption is increased (as compared to the first mode). The wireless device and the client devices operate in a master and slave configuration.

A wireless device may include one or more antennas, a wireless modem including a transceiver to transmit and receive signals through the one or more antennas, one or more processors, and a memory storing one or more programs configured for execution by the one or more processors. The one or more programs include instructions to perform this method. Also, a non-transitory computer-readable storage medium may store one or more programs configured for execution by one or more processors in a wireless device. The one or more programs include instructions to perform this method. For at least some embodiments, the transceiver is enabled during the active state, and the transceiver is disabled during the low power mode.

For at least some example embodiments, when operating in the first mode, the group owner transmits only one beacon during the beacon interval (e.g., to reduce power consumption); and when operating in the second mode, the group owner transmits one beacon during the first portion of the beacon interval and transmits one or more additional beacons during the second portion of the beacon interval (e.g., to increase discoverability).

Further, for at least some example embodiments, while the group owner is in the second mode, the group owner, during the second portion of the beacon interval, keeps its transceiver in the active state and powered up during operating windows associated with the one or more additional beacons, wherein each of the one or more additional beacons is transmitted at a beginning of a corresponding one of the operating windows; and powers down its transceiver outside of the operating windows. For one example embodiment, transmitting the one or more additional beacons during the second portion of the beacon interval includes transmitting additional beacons with a periodicity that is less than or equal to a known duration for which potential P2P client devices dwell on a channel while scanning.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Figure 1:
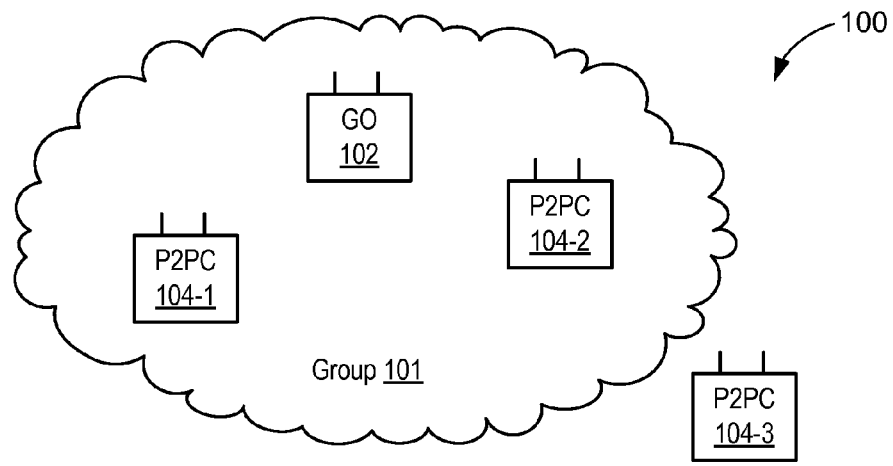
FIG. 1 is a block diagram of a wireless system within which the example embodiments may be implemented.

The example embodiments are described below in the context of a wireless system operating in accordance with one or more aspects of the IEEE 802.11 family of standards. It is to be understood that the example embodiments are equally applicable to other wireless networks (e.g., cellular networks, Bluetooth networks, pico networks, femto networks, satellite networks, and so on), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, the example embodiments may be implemented in wireless networks configured to operate as infrastructure WLAN systems, peer-to-peer (or Independent Basic Service Set) wireless systems, Wi-Fi Direct wireless systems, and/or Hotspots. In addition, although described herein in terms of exchanging data packets between wireless devices, the example embodiments may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

Further, the terms "sleep state" and "power save state" refer to a low power mode of operation during which one or more components of a Wi-Fi enabled device are deactivated or powered down (e.g., to prolong battery life), and thus the terms "sleep state," "power save state," "low power mode," and "low power state" may be used interchangeably herein. The term "active state" refers to a normal mode of operation during which the components of the Wi-Fi enabled device are activated or powered up (to allow normal communications). Thus, while the Wi-Fi enabled device may communicate with other devices during the active state, the Wi-Fi enabled device may not communicate with other devices during the low power mode (e.g., because one or more components of its transceiver(s) may be de-activated or powered down).

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1 is a block diagram of an example wireless system 100 within which the example embodiments may be implemented. The wireless system 100 is shown to include four wireless devices 102 and 104-1 to 104-3 for simplicity. Thus, although only four wireless devices are shown in FIG. 1, wireless system 100 may include any number of wireless devices. The wireless devices 102 and 104-1 to 104-3 may be any suitable Wi-Fi enabled wireless devices including, for example, cell phones, personal digital assistants (PDAs), tablet devices, laptop computers, routers, gateways, hubs, access points, or the like. For at least some embodiments, wireless devices 102 and 104-1 to 104-3 may each include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 6.

The example wireless system 100 is shown in FIG. 1 and described below in the context of a peer-to-peer (P2P) network that may, for example, operate according to the Wi-Fi Direct protocols (although other wireless protocols may be employed to govern the operation of wireless system 100). More specifically, wireless device 102 operates as a P2P group owner (GO) (and may hereinafter be referred to as the GO 102), and wireless devices 104-1 to 104-3 operate as P2P client devices (P2P clients) (and may hereinafter be referred to as the P2P clients 104-1 to 104-3). The GO 102 may perform the functions typically associated with an AP (e.g., admitting new members to the network, managing the network, broadcasting beacon frames, and so on), and the P2P clients 104-1 to 104-3 may operate as STAs.

In addition, the GO 102 may allow P2P clients devices 104 to connect to a network (e.g., a local area network (LAN), wide area network (WAN), metropolitan area network (MAN), and/or the Internet) using any suitable wired or wireless communication protocol(s).

Pairing of a P2P client 104 with the GO 102 may allow the P2P client 104 to subsequently associate with the GO 102. Once a P2P client 104 is associated with the GO 102, data may be exchanged between the two devices. In some embodiments, pairing may involve user intervention: a user of a P2P client 104 may select the GO 102 (e.g., from a list of available GOs as displayed by the P2P client 104) for pairing, or may accept an offer to pair with the GO 102. For some embodiments, pairing between a P2P client 104 and the GO 102 may continue after the association between the P2P client 104 and the GO 102 ends. For example, if a P2P client 104 moves out of wireless range of the GO 102 or otherwise disconnects from the GO 102, the P2P client 104 may remain paired with the GO 102. In this manner, a P2P client 104 that is paired with GO 102 may, after association ends, subsequently re-associate with the GO 102 (e.g., because the P2P client moves back into wireless range of the GO 102). For at least some embodiments, the GO 102 maintains a pairing table that lists the P2P clients 104 with which it is paired.

For the example wireless system of FIG. 1, first P2P client 104-1 and second P2P client 104-2 are paired with and are currently associated with (e.g., connected to) the GO 102, and may therefore exchange data with the GO 102. Together, the GO 102, first P2P client 104-1, and second P2P client 104-2 form a P2P group 101 (although the P2P group 101 may include any suitable number of P2P clients 104). In some embodiments, the P2P group 101 may operate as a basic service set (BSS). The third P2P client 104-3 is not currently associated with the GO 102, and is therefore not part of the P2P group 101. As a result, third P2P client 104-3 may not exchange data with the GO 102. For example, the third P2P client 104-3 may not be paired with the GO 102, which may prevent its association with the GO 102. Alternatively, the third P2P client 104-3 may be paired with the GO 102 but not currently associated with the GO 102 (e.g., because it is not within wireless range of the GO 102 or because it is has not yet discovered the presence of the GO 102).

Wireless signal traffic in the P2P group 101 may include data traffic and discovery traffic. Data traffic may include data frames transmitted between the GO 102 and the P2P clients 104-1 and 104-2. Data transmitted from the GO 102 to the P2P clients 104-1 and 104-2 is referred to as downlink (DL) data, and data transmitted from the P2P clients 104-1 and 104-2 to the GO 102 is referred to as uplink (UL) data. Discovery traffic may include messages (e.g., probe requests) transmitted by P2P clients 104 that are scanning for the GO 102, and messages (e.g., probe responses) transmitted by the GO 102 in response to the scanning (e.g., to associate the P2P clients 104 with the GO 102 and thus join the P2P clients to the P2P group 101).

For some embodiments, the GO 102 may control data traffic in the P2P group 101 using a request-and-response protocol. More specifically, the GO 102 may poll the P2P clients 104-1 and 104-2 for data traffic, and the P2P clients 104-1 and 104-2 may transmit any UL data to the GO 102 in response to the polling. For such embodiments, the P2P clients 104-1 and 104-2 may not transmit data without permission from the GO 102. Accordingly, the P2P group 101 may operate according to a master/slave configuration, for example, with the GO 102 acting as a master device and the P2P clients 104-1 and 104-2 acting as slave devices that transmit data under control of the master device. It is noted that the GO 102 does not control discovery traffic (e.g., the GO 102 does not control when or how often the P2P clients 104 may broadcast discovery requests).

Figure 2:
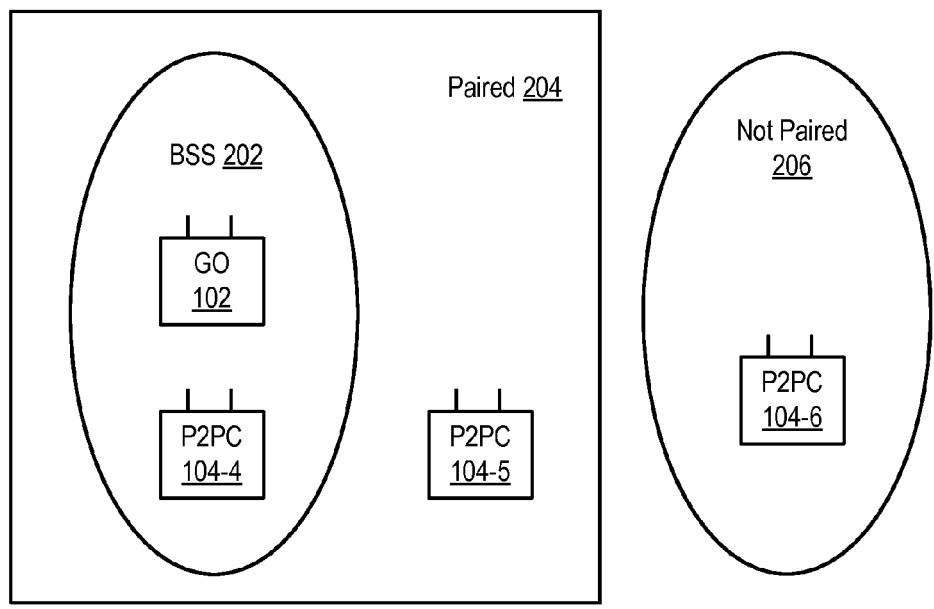
FIG. 2 is a Venn diagram showing possible types of client connection status in accordance with example embodiments.

FIG. 2 is a Venn diagram 200 showing possible types of client connection status in accordance with example embodiments. A BSS 202 includes the GO 102 and the one or more P2P clients 104-4 that are currently associated with the GO 102. The BSS 202 of FIG. 2 may be one embodiment of P2P group 101 of FIG. 1, and one or more P2P clients 104-4 of FIG. 2 may be one embodiment of the P2P clients 104-1 and 104-2 of FIG. 1. A set 204 of paired devices may include the BSS 202 (i.e., the GO 102 and the one or more P2P clients 104-4) and one or more other P2P clients 104-5 that are paired with the GO 102 but not currently associated with the GO 102. The one or more other P2P clients 104-5 may perform scanning operations to discover the GO 102, and thereafter join the BSS 202 by associating with the GO 102. Thus, if all P2P clients 104 that are paired with the GO 102 are also currently associated with the GO 102, then the BSS 202 and the set 204 of paired devices are the same. A set 206 of unpaired devices may include one or more other P2P clients 104-6 that are not paired with the GO 102.

Because the GO 102 maintains a list (e.g., an association table) of P2P clients 104 with which it is currently associated and also maintains a pairing table of P2P clients 104 with which it is paired, the GO 102 may determine whether there are any P2P clients 104 with which the GO 102 is paired but not currently associated. Thus, for the example depicted in FIG. 2, the GO 102 may determine that P2P client 104-5 is paired with GO 102 but not currently associated with GO 102, and may also determine that P2P client 104-6 is neither paired nor currently associated with GO 102. The GO 102 may use this information to determine whether to expect any discovery traffic from nearby P2P clients. For example, because P2P client 104-5 is paired with but not currently associated with GO 102, GO 102 may expect discovery traffic from P2P client 104-5 (e.g., at some point in the future). Conversely, if P2P client 104-5 becomes associated with GO 102 so that the BSS 202 and the set 204 of paired devices is the same, then the GO 102 may not expect discovery traffic (e.g., because there are no nearby P2P client devices with which the GO 102 is not paired and not associated). The absence of discovery traffic, combined with the ability of the GO 102 to control data traffic of P2P clients in BSS 202, may allow the GO 102 to enter a low power mode of operation (e.g., power save (PS) state) for a portion of each beacon interval. In other words, when the GO 102 does not expect any discovery requests, the GO 102 may enter the low power mode and power-down one or more portions of its transceivers to conserve power. While in the low power mode, the GO 102 may be in a sleep state and thus not able to transmit/receive data to/from other devices.

Figure 3:
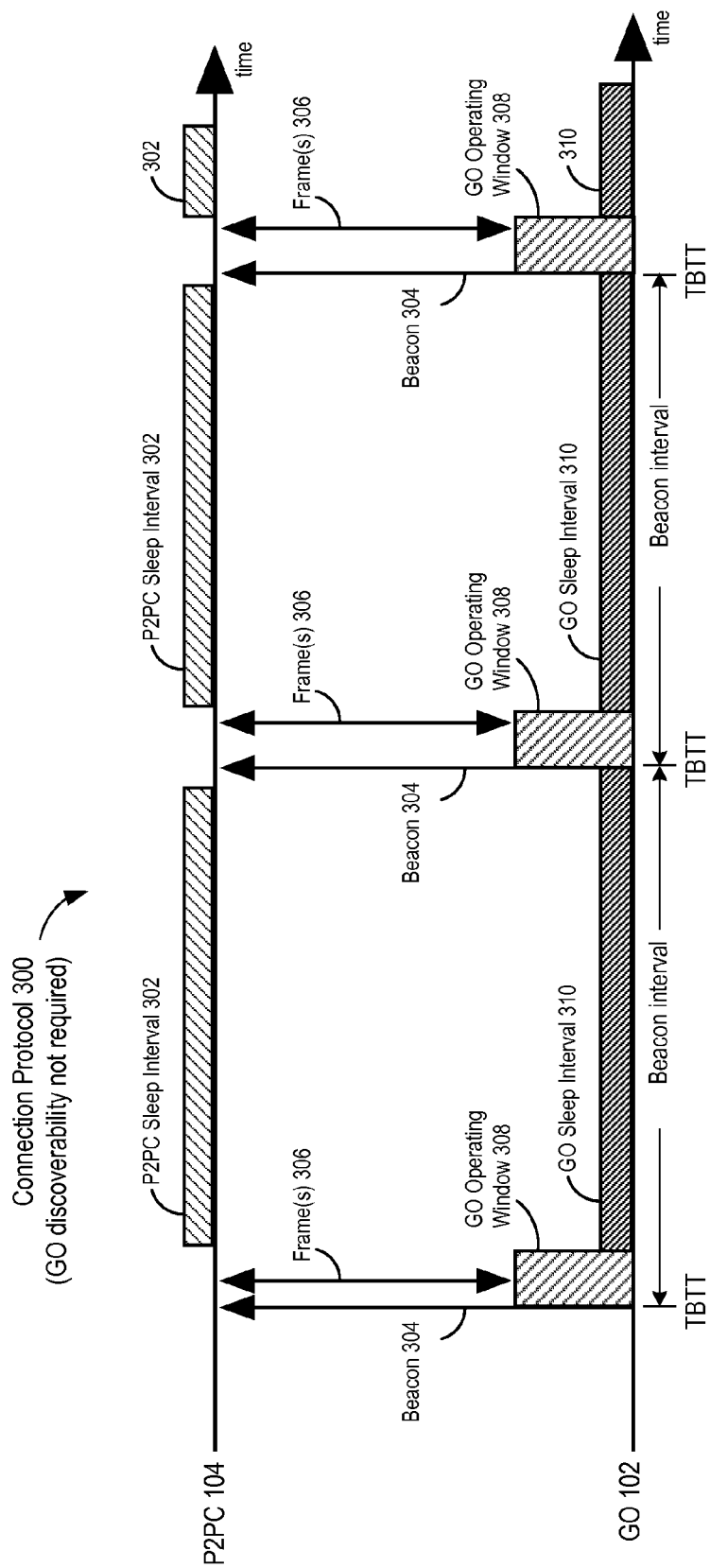
FIG. 3 is a timeline illustrating a connection protocol for a low power mode of operation in the absence of discovery traffic, in accordance with example embodiments.

FIG. 3 is a timeline illustrating a connection protocol 300 for a low power mode of operation in the absence of discovery traffic, in accordance with some embodiments. In the connection protocol 300, operation of the GO 102 is described with respect to beacon intervals. The GO 102 transmits a beacon 304 at each target beacon transmission time (TBTT), which are separated by the beacon interval. In one example, the beacon intervals are approximately 101 ms. The beacons 304 may be used to establish and/or maintain association between the GO 102 and P2P client devices 104, as well as to maintain synchronization between the GO 102 and client devices 104. Each beacon 304 may include an indication of whether data for respective P2P clients 104 is queued in the GO 102. For example, the beacon 304 may include a traffic indication map (TIM) indicating whether the GO 102 has buffered DL data for one or more of the P2P clients 104 that are associated with the GO 102. The TIM includes a number of bits (e.g., a bitmap), where each bit of the TIM may indicate whether a corresponding one of the associated P2P clients 104 has buffered DL data available in the GO 102. The beacon 304 may also include timing synchronization information, such as a timing synchronization function (TSF) value, that may be used to synchronize the clocks and timers of the associated P2P clients 104 with the GO 102. In this manner, the associated P2P clients 104 may know when the TBTTs occur (e.g., and therefore when to awake from a sleep state and enter an active state to receive the beacons 304).

At each TBTT, the GO 102 is in an active state that allows the GO 102 to broadcast the beacon 304. The GO 102 may remain in the active state during an operating window 308 that occupies a first portion of each beacon interval. The operating window 308 may sometimes be referred to as a client-traffic (CT) window because data may be exchanged between the GO 102 and P2P clients 104 during the operating window 308. More specifically, FIG. 3 depicts the GO 102 and P2P client(s) 104 exchanging frames 306 during the operating windows 308. The frames 306 may include data, control information, management information, and the like. The request-and-response protocol used in the P2P group 101 of FIG. 1 allows the GO 102 to ensure that all frames 306, and in general all data traffic, from the P2P client(s) 104 will be received by the GO 102 during the operating windows 308 (e.g., and thus when the GO 102 is in an active state and may transmit frames to the P2P clients 104 and/or receive frames from the P2P clients 104).

After the operating window 308, the GO 102 enters the low power mode (e.g., the sleep state) and remains in the low power mode for a sleep interval 310 that occupies a second portion of each beacon interval. In some embodiments, the second portion is the remainder of the beacon interval after the first portion (e.g., the beacon interval has a time duration equal to the sum of the time durations of the first and second portions). In other words, for some embodiments, the operating window 308 and the sleep interval 310 together account for the entire beacon interval. In the low power mode, at least a portion of the circuitry in the GO 102 (e.g., including one or more of its transceivers) is idled and/or powered down, such that its power consumption is lower than in the operating window 308. As a result, the GO 102 is unable to transmit data to or receive data from the P2P clients 104 during the sleep interval 310. The sleep interval 310 allows the GO 102 to save power and, if it is battery powered, to prolong battery life. The sleep interval 310 does not interfere with device performance, however: the request-and response protocol ensures that there is no data traffic during the sleep interval 310, and the GO 102 knows that there will be no discovery traffic because all paired P2P clients 104 are currently associated with the GO 102.

In some embodiments, the frames 306 in an operating window 308 include a sequence of frames 306 (e.g., a handshake) used to transfer data from the GO 102 to a P2P client 104. For example, if a beacon 304 indicates (e.g., using an asserted TIM bit) that data for the P2P client 104 is queued in the GO 102, then the P2P client 104 sends a polling message (e.g., a PS poll message) in a frame 306 to the GO 102 in the operating window 308 associated with the beacon 304. The GO 102 responds, in the same operating window 308, with a frame 306 that includes the data for the P2P client 104. The P2P client 104 responds, again in the same operating window 308, with a frame 306 that contains a response message acknowledging receipt of the data.

In some embodiments, the GO 102 limits the number of asserted TIM bits (or other traffic indicators) in each beacon 304 to perform flow control. For example, if the number of P2P clients 104 for which data is queued in the GO 102 exceeds a maximum value, the GO 102 may not assert TIM bits for all of these P2P clients 104 in a beacon 304. Instead, the GO 102 may limit the number of asserted TIM bits in the beacon 304 to the maximum value. The number of P2P clients 104 to which the GO 102 will transfer data in a particular operating window 308 (and therefore in a particular beacon interval) is thereby limited to the maximum value. For example, P2P clients 104 that have queued data in the GO 102, but do not have asserted TIM bits in the beacon 304, do not know that they have data queued in the GO 102. Therefore, these P2P clients 104 will not poll for data in response to the beacon 304. TIM bits for these P2P clients 104 may be asserted, and the corresponding data transmitted, in a subsequent operating window 308 (and therefore in a subsequent beacon interval). This flow control helps to ensure that the GO 102 may complete its transactions with respective P2P clients 104 within an operating window 308 of a given duration and then enter the sleep state during the subsequent sleep interval 310 of the beacon interval. Power savings thus may be achieved by sleeping during the sleep interval 310 even in the presence of high traffic, in accordance with some embodiments.

In some embodiments, the frames 306 in an operating window 308 include a sequence of frames 306 (e.g., a handshake) used to transfer data from a P2P client 104 to the GO 102. For example, a frame 306 (or the beacon 304) transmitted by the GO 102 may poll a P2P client 104 to check for queued data in the P2P client 104. The P2P client 104 responds to the poll by transmitting to the GO 102, in the same operating window 308 as the poll, a frame 306 with the data in its payload. The GO 102 responds, again in the same operating window 308, with a frame 306 that contains a response message acknowledging receipt of the data.

In some embodiments, the duration of the operating windows 308 (and thus the sleep intervals 310) may be fixed. Examples of the fixed duration of the operating windows 308 include, but are not limited to, fixed durations in a range between 10% of the beacon interval (e.g., 10 ms, assuming a 101 ms beacon interval) and 75% of the beacon interval (e.g., 75 ms, assuming a 101 ms beacon interval).

In some embodiments, the duration of the operating windows 308 may vary dynamically from beacon interval to beacon interval. For example, the GO 102 may modulate the duration of the operating windows 308 (and thus the sleep intervals 310) based on an amount of DL and/or UL data traffic. For example, the GO 102 may determine a duration of a respective operating window 308 based on the amount of data queued in the GO 102 for transmission to one or more P2P clients 104. The GO 102 may delay the beginning of a respective sleep interval 310 until all expected frames 306 have been received from P2P clients 104.

In some embodiments, the connection protocol 300 may be implemented using the Wi-Fi Direct Opportunistic Power Saving (OPS) feature, in which the GO 102 advertises (e.g., in beacons 304) the duration of the operating windows 308. In some embodiments, the connection protocol 300 may be implemented using the Wi-Fi Direct Notice of Absence (NoA) feature, in which the GO 102 advertises (e.g., in beacons 304) one or more future sleep intervals 310 during which the GO 102 will not be available for communication. Notice of Absence may be used to specify individual sleep intervals 310 and/or the periodic occurrence of sleep intervals 310.

The P2P clients 104 also may enter a low power mode during sleep intervals 302 in each beacon interval. In this low power mode, at least a portion of the circuitry in the P2P clients 104 (e.g., including wireless transceivers) is idled and/or powered down. The P2P clients 104 therefore are not operable for wireless communication during the P2P client (P2PC) sleep intervals 302. The P2P clients 104 may determine the durations of the sleep intervals 302 based on information in the beacons 304 (e.g., information advertising the operation windows 308 and/or sleep intervals 310), combined with their knowledge of the beacon interval and/or TBTTs. In some embodiments, a respective P2P client 104 may immediately go to sleep if a beacon 304 does not indicate the presence of queued DL data, in the GO 102, directed to the respective P2P client 104 (e.g., if the beacon does not include an asserted TIM bit for the respective P2P client 104).

As discussed above, the GO 102 may implement the connection protocol 300 in response to a determination that it is currently associated with all paired P2P clients 104. This determination indicates that no discovery traffic is expected. If discovery traffic is expected, the connection protocol 300 would compromise the ability of the GO 102 to respond to such discovery traffic. Discovery traffic (e.g., probe requests from a scanning P2P client 104) that arrived at the GO 102 during the sleep interval 310 would not be received and processed (e.g., the GO 102 would not respond to a probe request with a probe response while in the sleep state).

Accordingly, in some embodiments, the GO 102 may not use the connection protocol 300 if it is not currently associated with one or more of its paired client devices 104. Instead, the GO 102 may enter a discoverable mode and remain operable during at least part of the second portion of each beacon interval (i.e., the portion that would correspond to the sleep interval 310, were the GO 102 using the connection protocol 300). In this manner, the GO 102 may improve its ability to be discovered by P2P clients 104 by remaining in the active state for a longer portion of the beacon interval (although power consumption may be increased).

Figure 4:
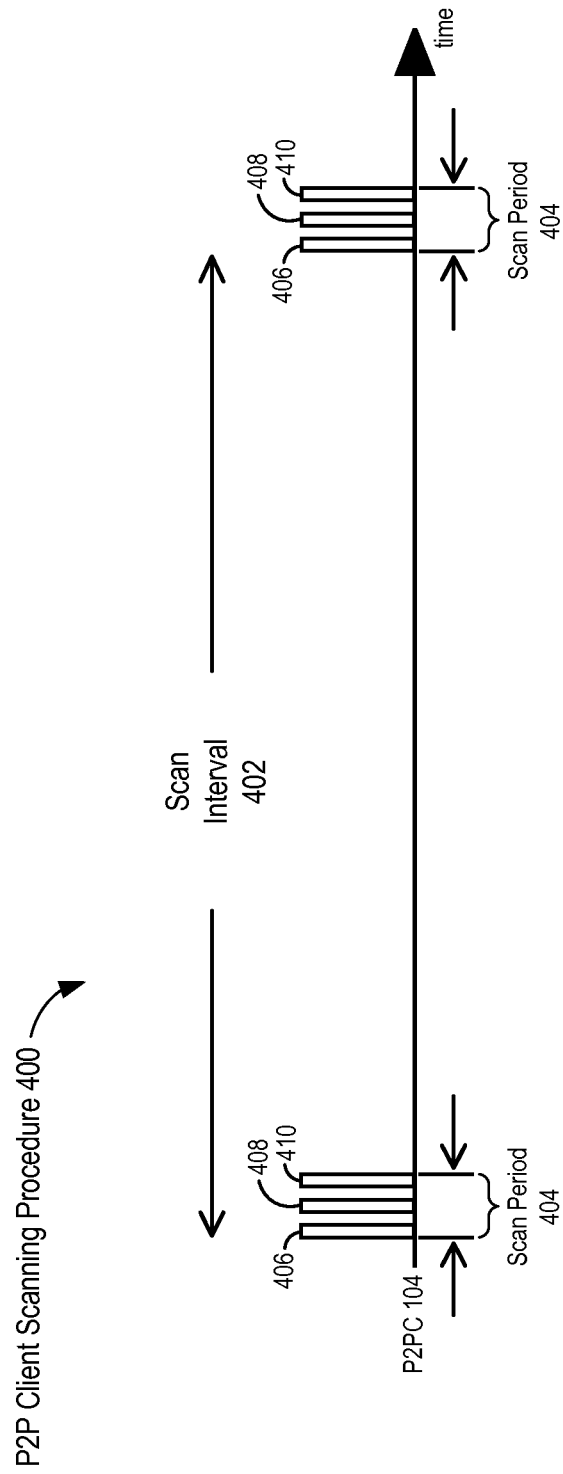
FIG. 4 shows an example scanning procedure for a P2P client device in accordance with example embodiments.

P2P clients 104 that are not currently associated with the GO 102 may scan to discover the GO 102. For example, FIG. 4 shows a scanning procedure 400 for a P2P client 104 in accordance with example embodiments. The scanning procedure 400 has a scan interval 402. Each scan interval 402 includes a scan period 404 during which the P2P client 104 performs scanning. The P2P client 104 scans on first, second, and third channels during respective time periods 406, 408, and 410. Scanning on a particular channel may be referred to as dwelling on the channel or listening to the channel. The first, second, and third channels may be non-overlapping channels (e.g., Wi-Fi channels 1, 6, and 11 in the 2.4 GHz wireless spectrum), although other channels may be scanned in the same and/or different wireless spectrums. In some embodiments, the P2P client 104 may perform active scanning by transmitting probe requests (e.g., one at the beginning of each of time periods 406, 408, and 410) and listening for probe responses from GO 102. Alternatively, the P2P client 104 may perform passive scanning by listening for beacons from GO 102. The P2P client 104 may sleep between successive scan periods 404.

Figure 5:
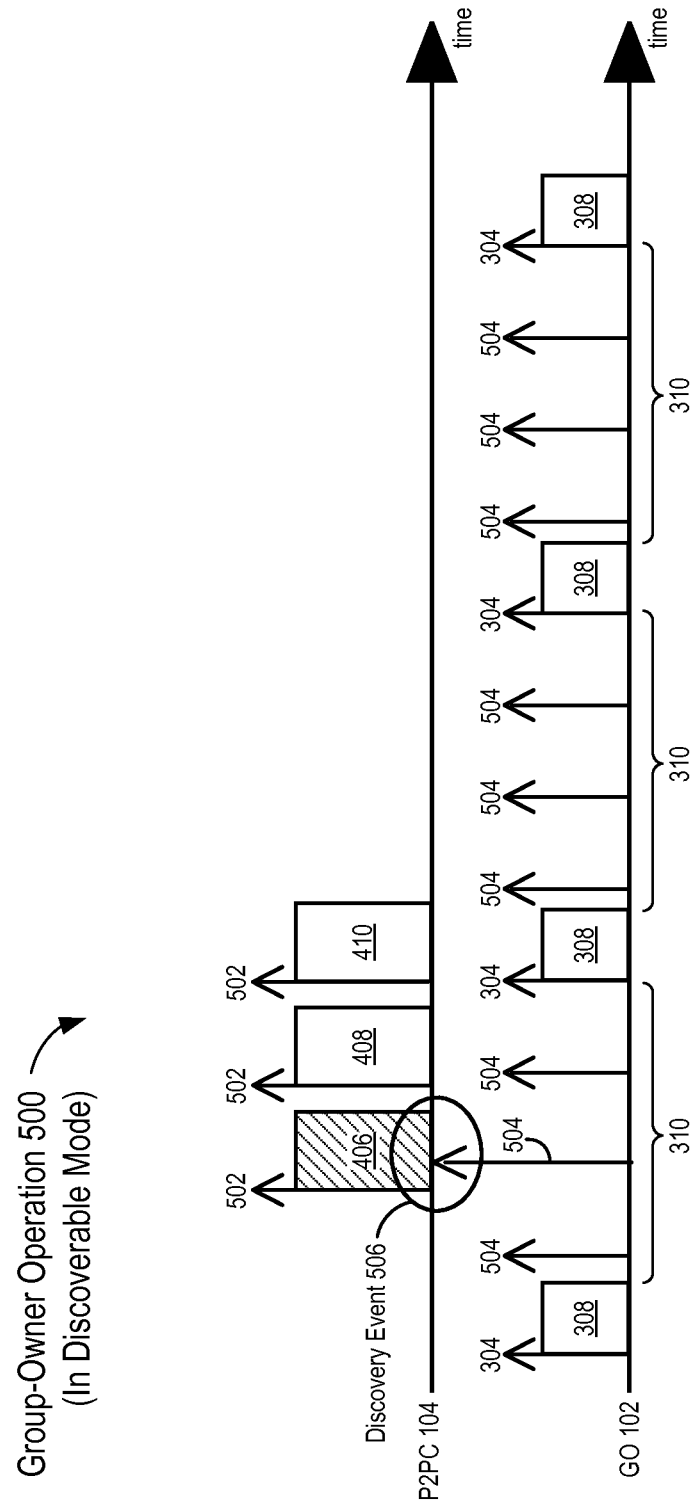
FIG. 5 is an example timeline depicting operation of a group owner in a discoverable mode in accordance with example embodiments.

FIG. 5 is a timeline illustrating a group owner operation 500 in a discoverable mode in which the GO 102 should be discoverable, in accordance with some embodiments. The GO 102 may elect to operate in this mode in response to a determination that not all paired P2P clients 104 are currently associated with the GO 102. The group owner operation 500 is merely one example of operation of the GO 102 in response to such a determination.

As shown in FIG. 5, the GO 102 may transmit a first beacon 304, and then transmit one or more additional beacons 504 in the second portion (as indicated by reference number 310) of each beacon interval. In this example, the beacon interval is defined as the time between successive beacons 304 (and thus is unchanged with respect to the connection protocol 300, FIG. 3). However, the inclusion of the additional beacons 504 may be considered to effectively decrease the beacon interval. In some embodiments, the time between successive additional beacons 504 is 10 ms or more.

The P2P client 104 is shown in FIG. 5 as performing active scanning: it transmits a probe request 502 on a respective channel at the beginning of each of time periods 406, 408, and 410 and then dwells on the respective channel for the remainder of the time period. Alternatively, the P2P client 104 may perform passive scanning. A discovery event 506 is shown in which the P2P client 104 receives a beacon 504 while listening on a respective channel during time period 406. The discovery event 506 informs the P2P client 104 of the presence of the GO 102; the P2P client 104 has thus discovered the GO 102. In response, the P2P client 104 transmits a unicast probe request, directed to the GO 102, that requests P2P client 104 to join the group 101 (see also FIG. 1). If the unicast probe request arrives outside of an operating window 308, the GO 102 will not respond. In this case, the P2P client 104 may then repeat transmission of the unicast probe request until the GO 102 responds, at which point the P2P client 104 may be joined to the group 101. (This example shows that a P2P client 104 may discover a GO 102 during active scanning through receipt of a beacon as well as through receipt of a probe response.)

In some embodiments, the GO 102 transmits the beacons 304 and 504 such that the time between successive beacons is less than or equal to the length of the time periods 406, 408, and 410, to ensure discoverability. In one example, the GO 102 transmits multiple (e.g., two) beacons 304 and/or 504 during each of the time periods 406, 408, and 410, resulting in prompt discovery.

In FIG. 5, operating windows 308 are shown as being associated with the beacons 304 but not the beacons 504. The GO 102 thus sleeps outside of the operating windows 308, except when transmitting the additional beacons 504. Alternatively, some or all of the additional beacons 504 may have associated operating windows 308. For example, each beacon, or a portion thereof, may be transmitted at the beginning of an operating window 308. In yet another example, the GO 102 does not sleep while in the discoverable mode. For example, the GO 102 may not sleep if it is does not know the scanning procedure 400 of P2P clients 104: in the absence of this knowledge, it cannot make an intelligent decision regarding what duration of sleep interval to use while still ensuring discoverability or providing a high likelihood of discovery.

In still another example, the GO 102 may increase the length of the operating window 308 as compared to its length for the connection protocol 300 (e.g., such that the resulting sleep interval length is less than or equal to the duration of each of the time periods 406, 408, and 410).

Figure 6:
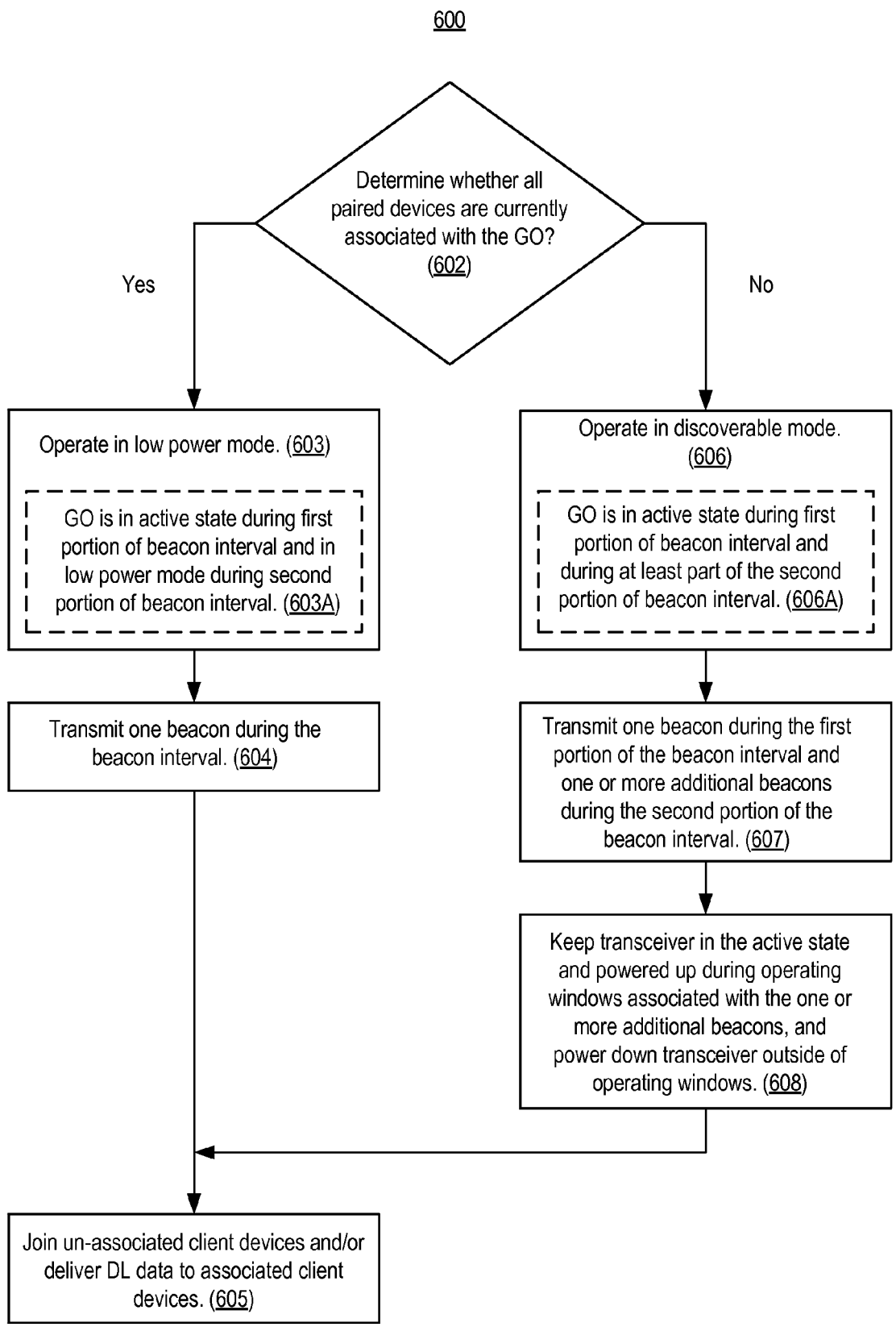
FIG. 6 is a flowchart showing an example operation for selecting an operating mode for a group owner in accordance with example embodiments.

FIG. 6 is a flowchart depicting a method 600 of selecting an operating mode for a GO 102 in accordance with example embodiments. The method 600 is performed by the GO 102. The GO 102 determines whether all paired devices are currently associated with the GO 102 (602). If all paired devices are currently associated with the GO 102, then the GO 102 may operate in a low power mode (603) (e.g., using the connection protocol 300, FIG. 3). During the low power mode, the GO 102 is in an active state during a first portion of a beacon interval and is in a low power mode during a second portion of the beacon interval, thereby reducing power consumption of the GO 102. Thereafter, the GO may transmit one beacon during each beacon interval, for example, as depicted in FIG. 3 (604). One or more client devices may response to the beacon and/or may transmit unicast probe requests seeking to join the P2P group. In addition, the beacon may indicate the presence of buffered DL data for one or more client devices. Thus, the GO 102 may join un-associated client devices and/or deliver DL data to associated client devices (605).

Conversely, if the GO 102 determines that not all paired devices are currently associated with the GO 102, as tested at 602, then the GO 102 may operate in a discoverable mode (606) (e.g., and perform group owner operation 500 or a variant thereof as described above with respect to FIG. 5). During the discoverable mode, the GO 102 is in the active state during the first portion and during at least part of the second portion of the beacon interval. By keeping its transceivers powered up during at least part of the second portions of beacon intervals, for example as depicted in FIG. 5, the GO 102 may increase the likelihood of being discovered by un-associated client devices (although at the expense of increased power consumption, compared to the low power mode). Thereafter, the GO 102 may transmit one beacon during the first portion of the beacon interval, and transmit one or more additional beacons during the second portion of the beacon interval (607). Further, for at least some embodiments, the GO 102 may keep its transceiver in the active state and powered up during operating windows associated with the one or more additional beacons, and power down its transceiver outside of the operating windows (608).

Figure 7:
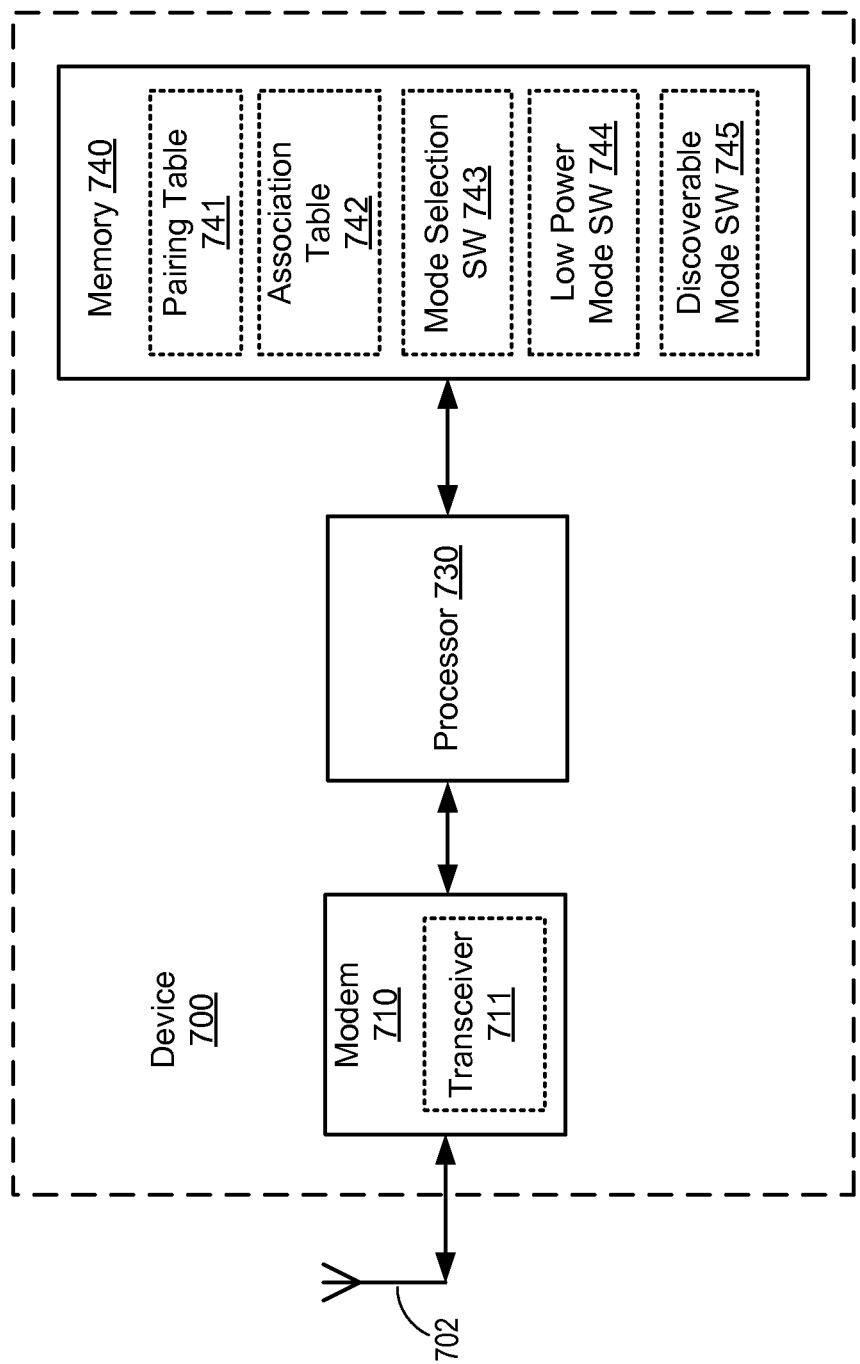
FIG. 7 is a block diagram of a wireless device configurable as a group owner in accordance with example embodiments.

FIG. 7 is a block diagram of a wireless device 700 in accordance with some embodiments. The wireless device 700 is an example of (or may be configured as) the GO 102. The wireless device 700 includes one or more antennas 702, a wireless modem 710 including at least a WLAN transceiver 711, one or more processors 730, and a memory 740. The one or more antennas 702 are coupled to wireless modem 710. Although depicted in FIG. 7 as including only WLAN transceiver 711, for actual embodiments modem 710 may include any number of transceivers capable of communicating using any suitable communication protocol including, for example, Bluetooth and cellular signals.

The WLAN transceiver 711 may be used to transmit signals to and receive signals from other devices such as P2P clients 104 (see also FIG. 1), and may be used to scan the surrounding environment to detect and identify other nearby wireless devices. For purposes of discussion herein, the one or more processors 730 are shown as being coupled between modem 710 and memory 740. For actual embodiments, modem 710, the one or more processors 730, and memory 740 may be connected together using one or more buses (not shown for simplicity).

Memory 740 may include a pairing table 741 that stores a list of devices (e.g., client devices 104) that are paired with wireless device 700. Memory 740 may include an association table 742 that stores a list of devices (e.g., client devices 104) that are currently associated with wireless device 700.

Memory 740 may also include a non-transitory computer-readable medium (e.g., one or more nonvolatile memory elements, such as EPROM, EEPROM, Flash memory, a hard drive, and so on) that can store the following software modules:

a mode selection software module 743 for selecting between the low power mode and the discoverable mode, for example by performing the method 600 of FIG. 6;

a low power mode software module 744 for operating in a low power mode, for example by implementing the connection protocol 300 of FIG. 3; and a discoverable mode software module 745 for operating in a discoverable mode, for example by performing group owner operation 500 or a variant thereof as described above with respect to FIG. 5.

Each software module includes instructions that, when executed by the one or more processors 730, cause wireless device 700 to perform the corresponding functions. The non-transitory computer-readable medium of memory 740 thus includes instructions for performing all or a portion of the operations of the method of FIG. 6.

Further, although described as an example of GO 102, the wireless device 700 may alternatively be a P2P client 104 (or be configurable as a P2P client 104). For example, the one or more programs may include instructions for performing the P2P client scanning procedure 400 (FIG. 4) and/or for implementing a sleep interval 302. Accordingly, the memory 740 may include instructions stored on a non-transitory computer-readable storage medium that, when executed by the one or more processors 730, cause the wireless device 700 to achieve the functionality of a P2P client 104 as described herein.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of operating a wireless device configured as a group owner of a peer-to-peer (P2P) group, the method comprising:

in response to a determination that all of a number of client devices paired with the group owner are currently associated with the group owner, entering a first mode during which the group owner is in an active state during a first portion of a beacon interval and is in a low power mode during a second portion of the beacon interval, and wherein the group owner only transmits one beacon during the beacon interval; and in response to a determination that not all of the number of client devices paired with the group owner are currently associated with the group owner, entering a second mode during which the group owner is in the active state during the first portion and during at least part of the second portion of the beacon interval, wherein the group owner transmits one beacon during the first portion of the beacon interval and transmits one or more additional beacons during the second portion of the beacon interval, and wherein the group owner operates as a master device and the client devices operate as slave devices.

2. The method of claim 1, wherein the group owner includes a transceiver, and wherein:

the transceiver is enabled during the active state; and
the transceiver is disabled during the low power mode.

3. The method of claim 1, further comprising:

in the second mode, during the second portion of the beacon interval:

keeping a wireless transceiver of the wireless device in the active state and powered up during operating windows associated with the one or more additional beacons, wherein each of the one or more additional beacons is transmitted at a beginning of a corresponding one of the operating windows; and powering down the wireless transceiver outside of the operating windows.

4. The method of claim 1, further comprising:
receiving a unicast probe request from a P2P client device in response to one of the one or more additional beacons; and
in response to receiving the unicast probe request, joining the P2P client device to the P2P group.

5. The method of claim 1, wherein transmitting the one or more additional beacons during the second portion of the beacon interval comprises transmitting additional beacons with a periodicity that is less than or equal to a known duration for which potential P2P client devices dwell on a channel while scanning.

6. The method of claim 1, further comprising:
in the first mode, during the first portion of the beacon interval:
providing an indication to a P2P client device that queued data is available for the P2P client device;
receiving a polling message from the P2P client device in response to the indication;
in response to receiving the polling message, transmitting a frame containing the queued data to the P2P client device; and
receiving an acknowledgment of the frame from the P2P client device.

7. The method of claim 6, wherein providing the indication to the P2P client device comprises asserting a bit in a traffic indication map in the beacon transmitted during the first portion of the beacon interval.

8. The method of claim 1, further comprising:
in the first mode, during the first portion of the beacon interval:
providing indications to a plurality of P2P client devices that queued data directed to the P2P client devices is available;
receiving polling messages from the plurality of P2P client devices in response to the indications; and
transmitting the queued data to the plurality of P2P client devices in response to the polling messages;
wherein the plurality of P2P client devices to which the indications are provided includes fewer devices than a total number of P2P client devices for which queued data is available.

9. The method of claim 8, wherein the plurality of P2P client devices to which the indications are provided does not exceed a maximum number of P2P client devices, regardless of the total number of P2P client devices for which queued data is available.

10. A wireless device configured as a group owner of a peer-to-peer (P2P) group, the wireless device comprising:
one or more antennas;
a wireless modem to transmit and receive signals through the one or more antennas, the wireless modem including a transceiver;
one or more processors; and
a memory storing one or more programs containing instructions that, when executed by the one or more processors, cause the wireless device to perform operations comprising:
in response to a determination that all client devices paired with the group owner are currently associated with the group owner, entering a first mode in which the group owner is in an active state during a first portion of a beacon interval and is in a low power mode during a second portion of the beacon interval, and wherein the group owner transmits only one beacon during the beacon interval; and
in response to a determination that not all client devices paired with the group owner are currently associated with the group owner, entering a second mode in which the group owner is in the active state during the first portion and at least part of the second portion of the beacon interval, and wherein the group owner transmits one beacon during the first portion of the beacon interval and transmits one or more additional beacons during the second portion of the beacon interval;
wherein the wireless device and the client devices operate in a master and slave configuration.

11. The wireless device of claim 10, wherein the one or more programs also comprise instructions to cause the wireless device to perform operations comprising:
keeping the transceiver powered up during the first portion of the beacon interval in both the first mode and the second mode;
in the first mode, powering down the transceiver during the second portion of the beacon interval; and
in the second mode, keeping the transceiver powered up during at least part of the second portion of the beacon interval.

12. The wireless device of claim 10, wherein the one or more programs also comprise instructions to cause the wireless device to perform operations comprising:
in the second mode, during the second portion of the beacon interval, keeping the transceiver in the active state and powered up during operating windows associated with the one or more additional beacons, wherein each of the one or more additional beacons is transmitted at a beginning of a corresponding one of the operating windows; and
powering down the transceiver outside of the operating windows.

13. The wireless device of claim 10, wherein the one or more programs also comprise instructions to cause the wireless device to perform operations comprising:
receiving a unicast probe request from a client device in response to the one or more additional beacons; and
in response to the unicast probe request, joining the client device to the P2P group.

14. The wireless device of claim 10, wherein transmitting the one or more additional beacons during the second portion of the beacon interval comprises transmitting beacons with a periodicity that is less than or equal to a known duration for which potential client devices dwell on a channel while scanning.

15. The wireless device of claim 10, wherein the one or more programs also comprise instructions to cause the wireless device to perform operations comprising:
in the first mode, during a first portion of the beacon interval:
providing an indication to a P2P client device that queued data is available for the P2P client device;
receiving a polling message from the P2P client device in response to the indication;
in response to receiving the polling message, transmitting a frame containing the queued data to the P2P client device; and
receiving an acknowledgment of the frame from the P2P client device.

16. The wireless device of claim 15, wherein providing the indication to the P2P client device comprises asserting a bit in a traffic indication map in the beacon transmitted during the first portion of the beacon interval.

17. The wireless device of claim 10, wherein the one or more programs also comprise instructions to cause the wireless device to perform steps comprising:
in the first mode, during the first portion of the beacon interval:
providing indications to a plurality of P2P client devices that queued data directed to the P2P client devices is available;
receiving polling messages from the plurality of P2P client devices in response to the indications; and
transmitting the queued data to the plurality of P2P client devices in response to the polling messages;
wherein the plurality of P2P client devices to which the indications are provided includes fewer devices than a total number of P2P client devices for which queued data is available.

18. The wireless device of claim 17, wherein the plurality of P2P client devices to which the indications are provided does not exceed a maximum number of P2P client devices, regardless of the total number of P2P client devices for which queued data is available.

19. A non-transitory computer-readable storage medium storing one or more programs containing instruction that, when executed by one or more processors in a wireless device configured to operate as a group owner of a peer-to-peer (P2P) group, causes the wireless device to:
in response to a determination that all client devices paired with the group owner are currently associated with the group owner, enter a first mode in which the group owner is in an active state during a first portion of a beacon interval and is in a low power mode during a second portion of the beacon interval, and wherein the group owner transmits only one beacon during the beacon interval; and
in response to a determination that not all client devices paired with the group owner are currently associated with the group owner, enter a second mode in which the group owner is in the active state during the first portion and at least part of the second portion of the beacon interval, and wherein the group owner transmits one beacon during the first portion of the beacon interval and transmits one or more additional beacons during the second portion of the beacon interval;
wherein the wireless device and the client devices operate in a master and slave configuration.

20. The non-transitory computer-readable storage medium of claim 19, wherein execution of the instructions causes the wireless device to:
a keep a wireless transceiver of the wireless device in the active state and powered up during the first portion of the beacon interval in both the first mode and the second mode;
in the first mode, power down the wireless transceiver during the second portion of the beacon interval; and
in the second mode, keep the wireless transceiver in the active state and powered up during at least part of the second portion of the beacon interval.

21. The non-transitory computer-readable storage medium of claim 19, wherein execution of the instructions causes the wireless device to:
in the second mode, during the second portion of the beacon interval:
keep a wireless transceiver of the wireless device in the active state and powered up during operating windows associated with the one or more additional beacons, wherein each of the one or more additional beacons is transmitted at a beginning of a corresponding one of the operating windows; and
power down the wireless transceiver outside of the operating windows.

22. The non-transitory computer-readable storage medium of claim 19, wherein execution of the instructions causes the wireless device to:
receive a unicast probe request from a client device in response to one of the one or more additional beacons; and
in response to receiving the unicast probe request, joining the client device to the P2P group.

23. The non-transitory computer-readable storage medium of claim 19, wherein transmitting the one or more additional beacons during the second portion of the beacon interval comprises transmitting beacons with a periodicity that is less than or equal to a known duration for which potential client devices dwell on a channel while scanning.

24. The non-transitory computer-readable storage medium of claim 19, wherein execution of the instructions causes the wireless device to:
in the first mode, during the first portion of the beacon interval:
provide an indication to a P2P client device that queued data is available for the P2P client device;
receive a polling message from the P2P client device in response to the indication;
in response to receiving the polling message, transmit a frame containing the queued data to the P2P client device; and
receive an acknowledgement of the frame from the P2P client device.

25. The non-transitory computer-readable storage medium of claim 19, wherein execution of the instructions causes the wireless device to:
in the first mode, during the first portion of the beacon interval:
provide indications to a plurality of P2P client devices that queued data directed to the P2P client devices is available;
receive polling messages from the plurality of P2P client devices in response to the indications; and
transmit the queued data to respective ones of the plurality of P2P client devices in response to the polling messages;
wherein the plurality of P2P client devices to which the indications are provided includes fewer devices than a total number of P2P client devices for which queued data is available.

26. The non-transitory computer-readable storage medium of claim 25, wherein the plurality of P2P client devices to which the indications are provided does not exceed a maximum number of P2P client devices, regardless of the total number of P2P client devices for which queued data is available.

27. A wireless device configured as a group owner, comprising:
means for entering a first mode, in response to a determination that all client devices are currently associated with the group owner, in which the group owner is in an active state during a first portion of the beacon interval and is in a low power mode during a second portion of the beacon interval, and wherein the group owner transmits only one beacon during the beacon interval; and means for entering a second mode, in response to a determination that not all client devices paired with the group owner are currently associated with the group owner, in which the group owner is in the active state during the first portion and at least part of the second portion of the beacon interval, and wherein the group owner transmits one beacon during the first portion of the beacon interval and transmits one or more additional beacons during the second portion of the beacon interval;

wherein the wireless device and the client devices operate in a master and slave configuration.

* * * * *